July 21, 1970   E. H. PAVIA   3,520,802
METHOD OF TREATING LIQUID WASTES
Filed April 26, 1968
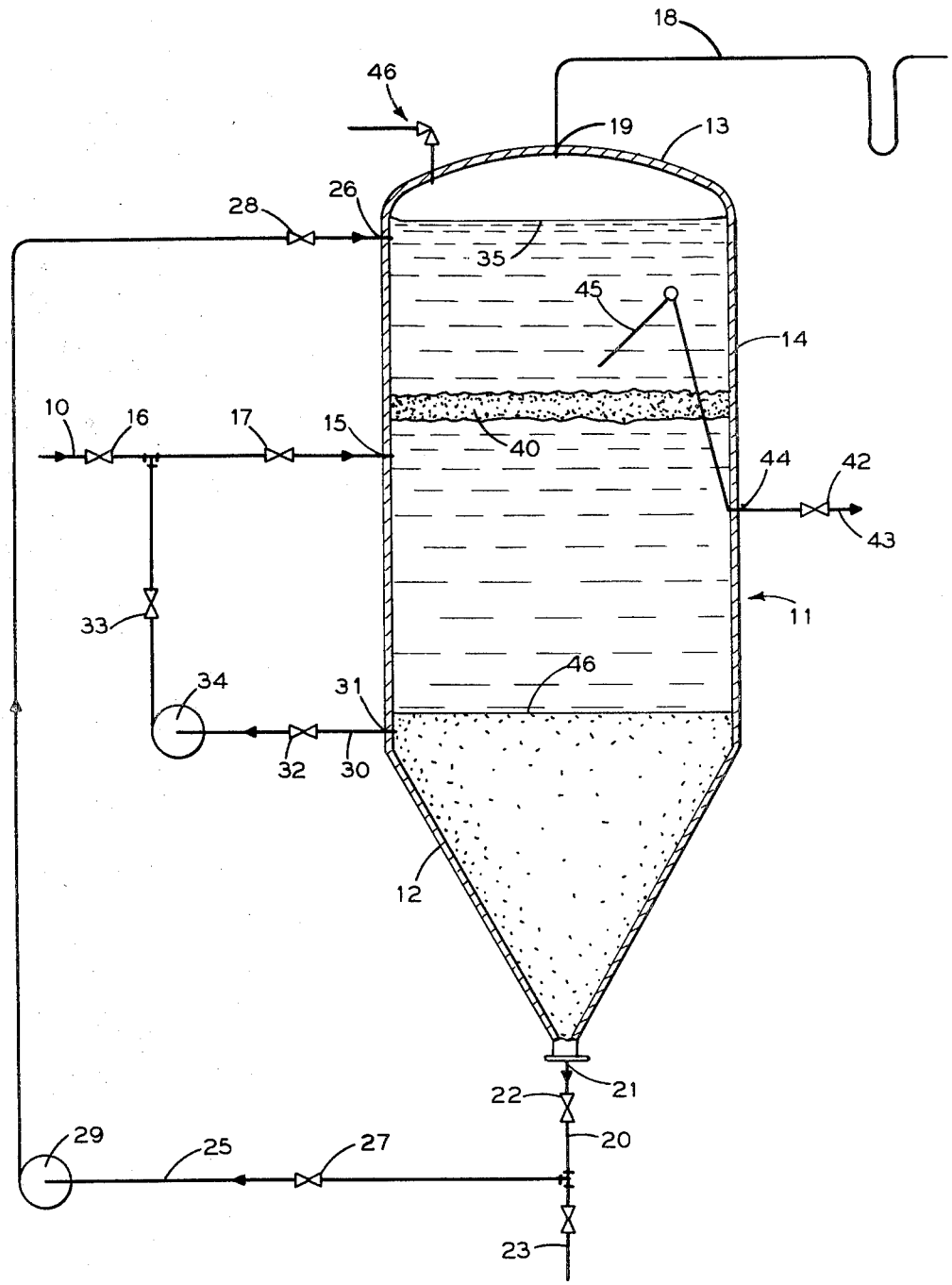
INVENTOR.
Edgar H. Pavia
BY
ATTORNEY

United States Patent Office 3,520,802
Patented July 21, 1970

3,520,802
METHOD OF TREATING LIQUID WASTES
Edgar H. Pavia, 610 Poydras St.,
New Orleans, La. 70112
Filed Apr. 26, 1968, Ser. No. 724,384
Int. Cl. C02c 5/10
U.S. Cl. 210—5                          4 Claims

ABSTRACT OF THE DISCLOSURE

A method of treating high protein liquid wastes under anaerobic conditions to effect a substantial reduction in the biochemical oxygen demand thereof, in a relatively short treatment time.

BACKGROUND OF THE INVENTION

Wastes of high protein content such as feed mill, brewery, slaughter house, poultry processing, frozen food packing, cannery and like wastes, which are high in protein content, have a very high biochemical oxygen demand (BOD), which due to the nitrogen contained in protein present ever increasing problems in the disposal of the same.

Proteins, which are nitrogenous compounds, are undesirable in waste streams due both to the relatively high biochemical oxygen demand of the waste and the nitrogen in the resulting waste since nitrogen is a nutrient for algae growth in streams.

Pollution problems have reached a stage where stringent regulations concerning the characteristics of wastes discharged to streams and public sewer systems have been established and are being rigorously enforced. As these wastes are highly objectionable, pressures are being exerted to treat the wastes to materially reduce both the biochemical oxygen demand and the nitrogen content thereof.

While several waste treatments which reduce the BOD of the wastes are known, such procedures are distinguished by extremely slow treatment rates which render the same almost prohibitive in cost.

Accordingly, an object of this invention is to provide an improved method of treating liquid wastes of high protein content and very high BOD to materially reduce the BOD in a very short time interval thereby substantially minimizing the cost of bringing such wastes to forms more readily disposed of.

Another object of this invention is to provide a waste treatment of the character described, which entails the use of a minimum amount of equipment, thereby keeping the necessary capital investment at a minimum.

Still another object of this invention is to provide an improved liquid waste treatment wherein a recoverable sludge of very high protein content is formed; such sludge having a salvage value effective to further reduce the cost of treating the incoming liquid waste.

Other objects of this invention will in part be obvious and in part hereinafter pointed out.

BRIEF DESCRIPTION OF THE DRAWING

The single figure of the drawing is a diagrammatic showing of the method of treating liquid wastes in accordance with the instant invention.

DESCRIPTION OF THE PREFERRED EMBODIMENT

In accordance with the invention, liquid wastes such as those which emanate from feed mills, breweries, poultry processors, frozen food plants, canneries and the like, are treated in a manner to materially reduce their BOD and nitrogen content to such values whereby the treated waste may be turned over to municipal waste disposal systems with minimum objection and at reduced or no economic penalties; or discharged directly to receiving streams where the established standards for the receiving stream will so allow.

Such wastes are distinguished by very high protein content in the form of liquid solubles and insolubles, and a very high BOD, which may range up to 600 to 30,000 p.p.m.

As shown in the single figure, 10 designates a line carrying the raw liquid waste of high protein content, which is to be treated in a sealed chamber generally indicated at 11. Chamber 11 may take the form of a tank having a conical lower portion 12, a domed top portion 13 and an intermediate cylindrical portion 14.

The incoming waste line 10 enters tank portion 14 at inlet 15, with valves 16, 17 in said line. The tank 11 is sealed and therefore the treatment is conducted under anaerobic conditions. A water seal line 18 extends from an outlet 19 in crowned tank portion 13. A drainage line 20 extends downwardly from the bottom outlet 21 in conical tank portion 12; with valves 22, 23 in said line.

Mixing in tank 11 is accomplished by continuous circulation, via a line 25 which extends from drainage line 20 at a point between valves 22, 23 therein, to an inlet 26 at the top of tank portion 14, with valves 27, 28 and a pump 29 interposed in line 25.

Selective mixing in tank 11 is also accomplished by continuous circulation via a line 30 extending from an outlet 31 located at a level depending on the characteristics of the waste being treated, to line 10 at a point between valves 16, 17; said line 30 having valves 32, 33 and a pump 34 interposed therein.

In operating the system, with tank 11 empty, all valves except valves 16, 17 are closed and the raw waste is supplied to tank 11 from line 10 until a level 35 therein is reached. Valves 16 and 17 are then closed, while valves 22, 27 and 28 are opened and pump 29 is started. Pump 29 operates at a relatively high rate of speed to provide a very fast mixing of the entire contents of tank 11 and to achieve a proper mixture of liquid and suspended solids at a selected ratio thereof. During this mixing period, some gas is generated which will drive some of the water out of seal 18, a relief chamber, not shown, being provided to receive such water.

When the proper mixed liquor-suspended solids ratio is reached, valves 22, 27 and 28 are closed; pumpage is stopped, and valves 32, 33 and 17 are opened. Pump 34 is started and operates at a relatively low rate of speed to continue mixing. This mixing operation is effected to provide a gentle mixing of the contents of tank 11 at the lower portions thereof and the formation of a blanket of colloidal form as at 40 which is slightly above the level of inlet 15. The speed rate of mixing at both the high and low rate will depend on the characteristics of the waste being treated and the hydraulic characteristics of the waste being treated and the hydraulic characteristics of the tank. In tests, the ratio between the high rate of mixing and the low rate has varied from 2:1 to 6:1 depending on the individual waste treated.

Blanket 40 is effective to prevent solids from rising into the liquid zone lying between level 35 and a level at inlet 15. During the low rate mixing operation, the pH of the recirculated liquid is checked carefully as it drops from an initial value of the order of 3.5 to 6.0 to a value of the order of 2.0 to 3.5. At this time, gas generated is re-absorbed by the liquid waste through oxidation and the reduction in pH causes soluble protein to precipitate out from the liquid.

When the pH has been suitably reduced, valves 32, 17 and 33 are closed. A valve 42 in a line 43 connected to a draw off outlet 44 in an upper portion of tank portion 14 is opened. Internally of tank portion 14 is a jointed draw off conduit 45, connected to outlet 44, which is used to draw off the treated liquid to a selected lower level. Draw off conduit 45 may be manipulated by suitable means, not shown.

Valve 42 is then closed and valves 22, 23 are opened to draw the sludge accumulated in the lower portions of tank 11 to a level 46, immediately above outlet 31. This provides seed material for the second mixing phase as described above. The two phase mixing operation described above, is then repeated. The high protein content sludge drawn off may be recoverd and utilized commercially. A pressure-vacuum relief valve is indicated at 46.

It has been found that the initial mixing phase may extend over a period of from about five to about twenty minutes while the second mixing phase has a time period of from about fifty to about seventy minutes. Accordingly, the treatment has a total time period not exceeding fifty-five to ninety minutes.

The mixing intervals will vary with the protein content of the waste, the suspended solids of the waste and the temperature maintained in the tank. In tests it has been found that utilizing the same waste, the time for the completed reaction will be decreased approximately 1 minute per each 3° F. increase in temperature maintained.

By way of example, liquid waste samples from spent brewers grain were taken before and after treatment in accordance with the process disclosed herein, with the following test results:

| Sample | | BOD, mg./l. | Total suspended matter, mg./l. | Total protein, g./l. | Total carbohydrate, g./l. |
|---|---|---|---|---|---|
| 7/19 | Raw | 23,850 | 21,000 | 12.50 | 15.80 |
| 7/19 | Treated | 13,500 | 2,150 | 3.56 | 13.60 |
| 7/21 | Raw | 19,440 | 27,000 | 18.80 | 8.90 |
| 7/21 | Treated | 11,490 | 1,350 | 2.38 | 7.20 |
| 7/21 | Sludge | 38,250 | 210,000 | 44.50 | 14.50 |

These results are based on composite samples of several runs each day.

The five day 20° C. Biochemical Oxygen Demand (BOD) tests and the total suspended determinations were conducted in accordance with standard test practice. Total protein content was determined by the method of Lowry et al. (J. Biol. Chem. 193, 265–275, 1951). Total carbohydrate content was determined by the anthrone method of Morris (Science 107, 254, 1948).

It will be apparent that with a relatively short treatment period, the BOD is substantitally reduced, so that the effluent is in a more manageable condition for passage to municipal sewage disposal lines or to further treatment or to a stream.

Further, the sludge represents a substantial build up in protein, which may be recovered by suitable procedures known in the art, for commercial usage.

As various changes might be made in the embodiment of the invention herein shown without departing from the spirit thereof, it is understood that all matter herein described or illustrated is not limiting except as set forth in the appended claims.

I claim:

1. A method of treating liquid wastes under anaerobic conditions to reduce the biochemical oxygen demand thereof comprising introducing liquid wastes of high protein content into a closed airtight chamber containing a sludge of high protein content, continuously removing sludge from the bottom of the chamber and reintroducing it at a higher rate of speed into the chamber beneath the level of the liquid waste at the top of the chamber and thereby mixing the liquid waste and sludge for an initial time period, stopping the mixing at the end of the initial time period, thereafter continuously removing sludge from a zone of the chamber intermediate the ends thereof and reintroducing it at a low rate of speed for a second time period into the chamber at a location beneath the point of reintroductiin during the initial time period and thereby mixing the liquid waste and sludge during the second time period, stopping said mixing when the pH has been reduced to from about 2.0 to about 3.5 and drawing off the treated liquid waste; the initial and second time periods totalling from about 50 to about 90 minutes.

2. A method as in claim 1, wherein the soluble protein content of said liquid waste is precipitated therefrom during said second time period and deposited with said sludge.

3. A method as in claim 1 wherein soluble protein is precipitated from said liquid waste when the pH thereof is reduced, said precipitated protein in a predetermined amount being added to said sludge.

4. A method as in claim 3 wherein precipitated protein in excess of said predetermined amount is drawn off from said chamber.

References Cited

UNITED STATES PATENTS

| 2,786,025 | 3/1957 | Lamb et al. | 210—197 X |
| 3,078,999 | 2/1963 | Kelly | 210—14 X |
| 3,156,646 | 11/1964 | Cameron | 210—14 X |

FOREIGN PATENTS

| 445,697 | 4/1936 | Great Britain. |
| 1,023,550 | 3/1966 | Great Britain. |

OTHER REFERENCES

McCabe, J., et al.: Biological Treatment of Sewage and Industrial Wastes, vol. II, anaerobic digestion etc., Reinhold Publishing Corp., 1958, pp. 28–36.

Keefer, C. E.: Sewage Treatment Works, first edition, 1940, McGraw-Hill, New York, pp. 167–174.

MICHAEL E. ROGERS, Primary Examiner

U.S. Cl. X.R.

210—14, 197